US009699237B2

United States Patent
Jansson et al.

(10) Patent No.: US 9,699,237 B2
(45) Date of Patent: Jul. 4, 2017

(54) MANAGED MEDIA RELAY SELECTION FOR REAL-TIME COMMUNICATIONS

(71) Applicant: Oracle International Corporation, Redwood Shores, CA (US)

(72) Inventors: Andreas E. Jansson, San Francisco, CA (US); Terje Strand, San Francisco, CA (US); Binod Pankajakshy Gangadharan, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 203 days.

(21) Appl. No.: 14/672,280

(22) Filed: Mar. 30, 2015

(65) Prior Publication Data

US 2016/0294913 A1 Oct. 6, 2016

(51) Int. Cl.
 *G06F 15/16* (2006.01)
 *H04L 29/06* (2006.01)
 *H04L 29/08* (2006.01)
 *H04L 29/12* (2006.01)

(52) U.S. Cl.
 CPC ........ *H04L 65/608* (2013.01); *H04L 61/2575* (2013.01); *H04L 61/2589* (2013.01); *H04L 65/1006* (2013.01); *H04L 65/1069* (2013.01); *H04L 67/02* (2013.01); *H04L 61/2514* (2013.01)

(58) Field of Classification Search
 None
 See application file for complete search history.

(56) References Cited

U.S. PATENT DOCUMENTS

| 2007/0076729 | A1* | 4/2007 | Takeda | H04L 61/2564 370/401 |
| 2008/0123685 | A1* | 5/2008 | Varma | H04L 12/58 370/466 |
| 2013/0185440 | A1* | 7/2013 | Blau | H04L 61/2589 709/227 |
| 2014/0222893 | A1 | 8/2014 | Gangadharan et al. | |
| 2014/0222894 | A1 | 8/2014 | Gangadharan et al. | |
| 2014/0222930 | A1 | 8/2014 | Gangadharan et al. | |
| 2014/0222957 | A1 | 8/2014 | Gangadharan et al. | |

(Continued)

OTHER PUBLICATIONS

'Oracle Communications WebRTC Session Controller'; security guide; Release 7.0; E40975-01; Nov. 2013.

(Continued)

*Primary Examiner* — Younes Naji
(74) *Attorney, Agent, or Firm* — Miles & Stockbridge P.C.

(57) ABSTRACT

A system provides a media relay for real-time communications ("RTC"). The system receives, by a signaling server, a first signaling message from a first client including one or more first candidate transport addresses of the first client. The system generates a modified first signaling message by inserting a transport address of a relay server into the first signaling message, and transmits the modified first signaling message to a second client. Then, the system receives a second signaling message from the second client including one or more second candidate transport addresses of the second client. The system generates a modified second signaling message by inserting the transport address of the relay server into the second signaling message, and transmits the modified second signaling message to the first client.

20 Claims, 6 Drawing Sheets

(56) References Cited

U.S. PATENT DOCUMENTS

2014/0222963 A1    8/2014   Gangadharan et al.

OTHER PUBLICATIONS

Mahy, et al., "Traversal Using Relays around NAT (TURN): Relay Extensions to Session Traversal Utilities for NAT (STUN)", Internet Engineering Task Force (IETF) Request for Comments 5766, Apr. 2010.
Rosenberg et al., "Session Traversal Utilities for NAT (STUN)", Network Working Group Request for Comments 5389, Oct. 2008.
J. Rosenberg, "Interactive Connectivity Establishment (ICE): A Protocol for Network Address Translator (NAT). Traversal for Offer/Answer Protocols", Internet Engineering Task Force (IETF) Request for Comments 5245, Apr. 2010.

* cited by examiner

MANAGED MEDIA RELAY SELECTION FOR REAL-TIME COMMUNICATIONS

FIELD

One embodiment is directed generally to a communications network, and in particular, to relaying traffic in a communications network.

BACKGROUND INFORMATION

Voice communications are increasingly shifting to web and Internet based applications that are outside of traditional telephony networks. Enterprise users desire to access their unified communications applications with their own Internet connected mobile devices, and consumers increasingly prefer Internet-based communications channels for accessing contact centers.

Some communications service providers ("CSPs") and enterprises have deployed real-time communications ("RTC") applications based on a protocol known as WebRTC. WebRTC is an open Internet standard for embedding real-time multimedia communications capabilities (e.g., voice calling, video chat, peer to peer ("P2P") file sharing, etc.) into a web browser. For any device with a supported web browser, WebRTC can use application programming interfaces ("APIs") to equip the device with RTC capabilities without requiring users to download plug-ins. By using WebRTC, CSPs may create new web based communications services and extend existing services to web based clients.

SUMMARY

One embodiment is a system that provides a media relay for real-time communications ("RTC"). The system receives, by a signaling server, a first signaling message from a first client including one or more first candidate transport addresses of the first client. The system generates a modified first signaling message by inserting a transport address of a relay server into the first signaling message, and transmits the modified first signaling message to a second client. Then, the system receives a second signaling message from the second client including one or more second candidate transport addresses of the second client. The system generates a modified second signaling message by inserting the transport address of the relay server into the second signaling message, and transmits the modified second signaling message to the first client.

DETAILED DESCRIPTION

Embodiments provide transparent relaying of media traffic (e.g., audio, video, data, etc.) for Real-Time Communications ("RTC") of WebRTC-based clients that cannot directly communicate due to network address translation ("NAT"). In one embodiment, when such clients are performing a signaling message exchange through a signaling server to set up a media session, the signaling server transparently inserts a relay server as a candidate in the signaling messages of each client (i.e., without the clients being aware). In one embodiment, if the clients do not find a better way to establish a connection, they use the relay server to relay media traffic. Accordingly, embodiments bridge two WebRTC-based clients that are located behind NAT servers, without the applications having to provide a relay server candidate.

Figure 1:
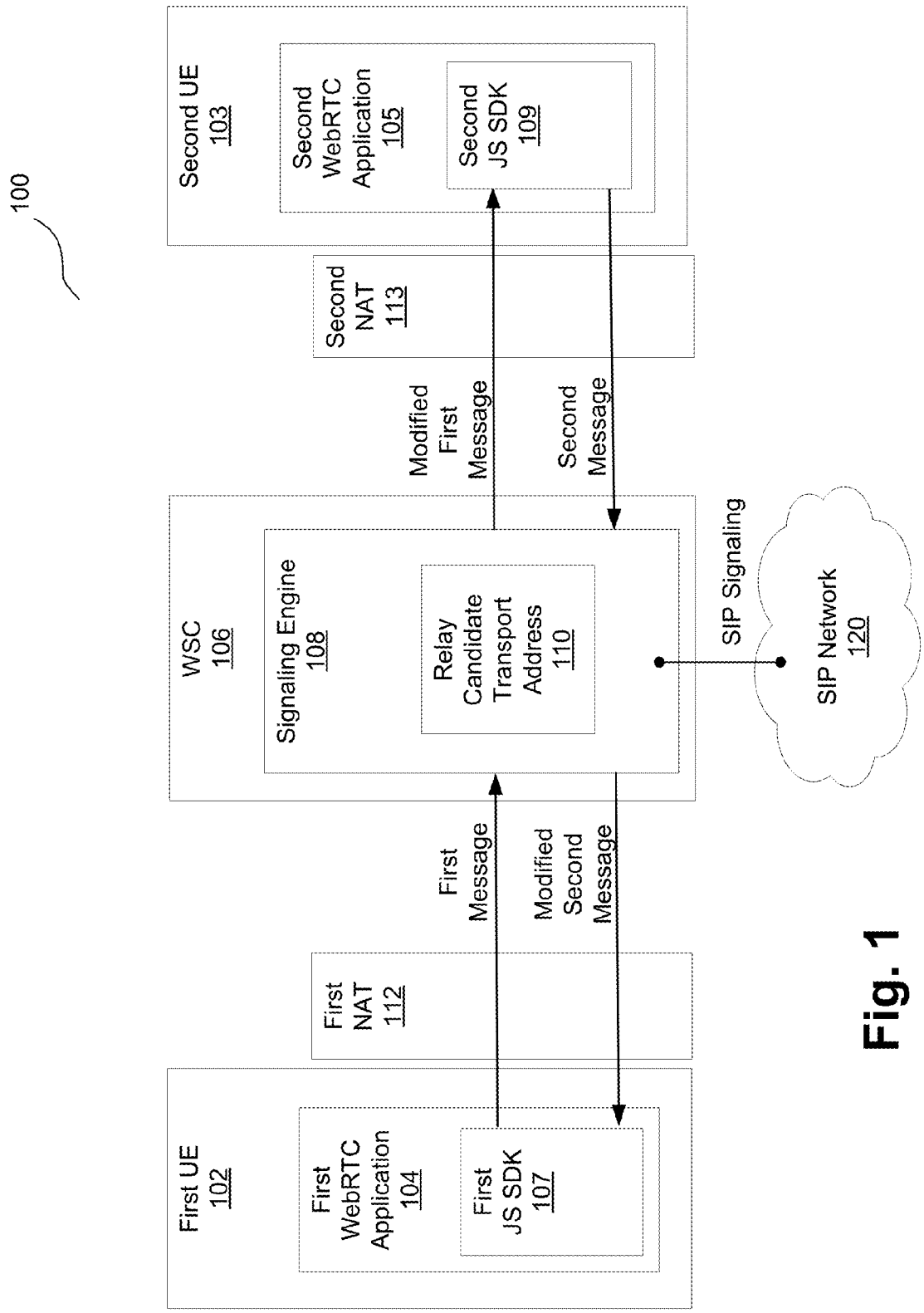
FIG. 1 is an overview diagram of a network including network elements that implement embodiments of the present invention and/or interact with embodiments of the present invention.

FIG. 1 is an overview diagram of a network 100 including network elements that implement embodiments of the present invention and/or interact with embodiments of the present invention. Network 100 includes a first user equipment ("UE") 102 that executes a first WebRTC application 104 in a web browser, and a second UE 103 that executes a second WebRTC application 105 in a web browser. WebRTC technology enables RTC in a browser as defined in the Internet Engineering Task Force ("IETF") and World Wide Web Consortium ("W3C") standards. RTC refers to a mode of communications in which users exchange information instantly or with negligible latency. First UE 102 and second UE 103 may be any device used by an end user for communications, such as a smartphone, a laptop computer, a tablet, a television, etc.

Network 100 further includes a WebRTC session controller ("WSC") 106 that is a gateway for connecting a web application with a communications network. A gateway translates a protocol to another protocol. In FIG. 1, WSC 106 connects first WebRTC application 104 and second WebRTC application 105 to a session initiation protocol ("SIP") network 120. SIP is a signaling communications protocol conventionally used for controlling multimedia communications sessions (such as voice and video calls) over Internet Protocol ("IP") networks. An example of SIP network 120 is an IP Multimedia Subsystem ("IMS") network. IMS is an architectural framework for delivering IP multimedia services. In the non-limiting example of FIG. 1, first WebRTC application 104 and second WebRTC application 105 are connected to SIP network 120 by the same gateway, i.e., WSC 106. However, in other alternative example systems, first WebRTC application 104 and second WebRTC application 105 may be connected to SIP network 120 through different respective gateways.

WSC 106 provides interoperability for web-to-web and web-to-network RTC. WSC 106 includes a signaling engine 108 that bridges WebRTC signaling to SIP signaling. Signaling engine 108 allows the clients to locate each other and perform signaling. In one embodiment, in order to initiate RTC between first WebRTC application 104 (or second WebRTC application 105) and an entity connected to SIP network 108, first WebRTC application 104 (or second WebRTC application 105) establishes a signaling channel with signaling engine 108 over a JavaScript Object Notation ("JSON") protocol for RTC ("JsonRTC"). JSON is a lightweight data-interchange format. JsonRTC establishes the sessions and subsessions used to pass messages between WSC 106 and its client applications. Then, another signaling channel based on SIP is established between signaling engine 108 and SIP network 120.

Figure 2:
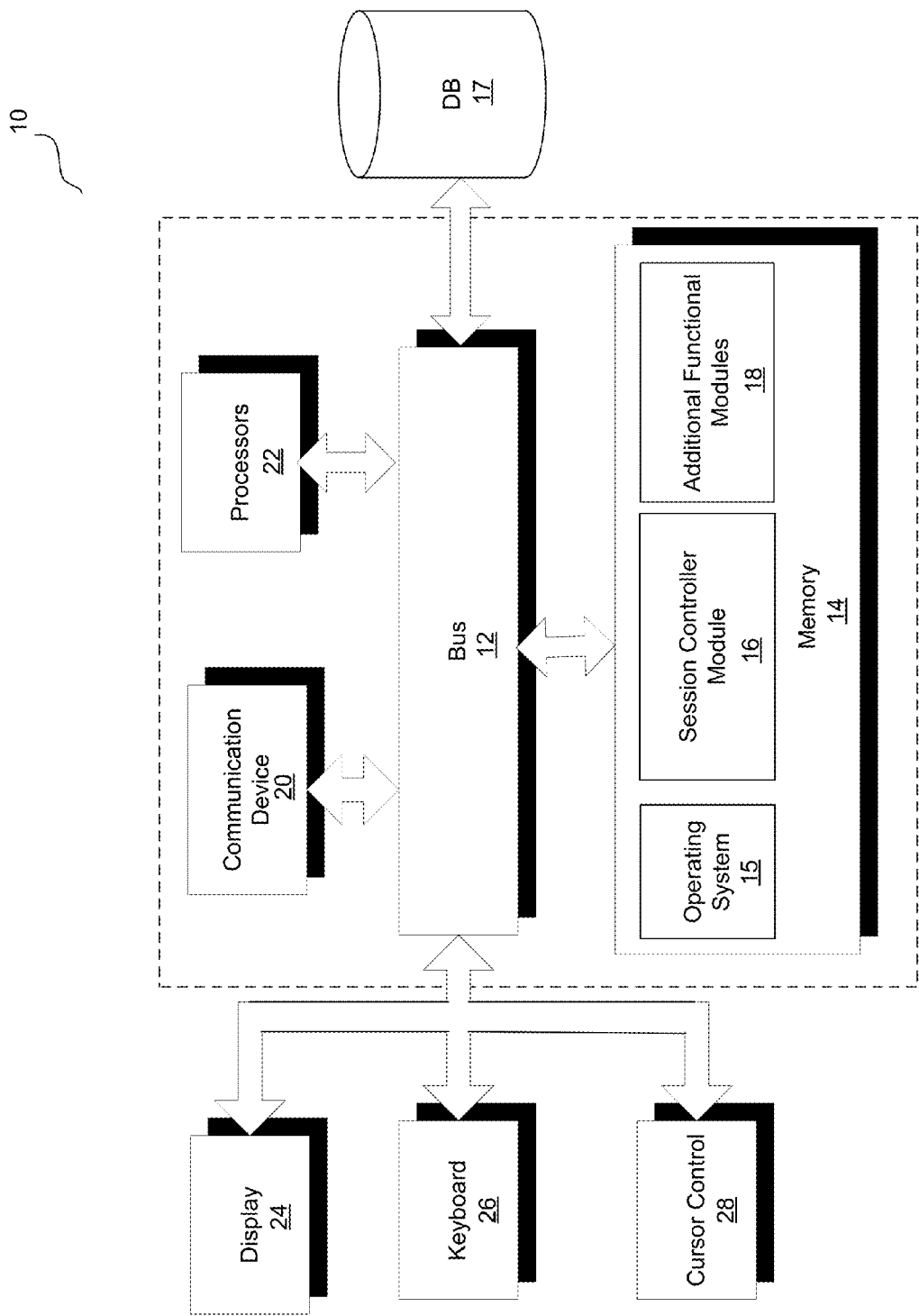
FIG. 2 is a block diagram of a computer server/system in accordance with embodiments of the present invention.

FIG. 2 is a block diagram of a computer server/system (i.e., system 10) in accordance with an embodiment of the present invention. System 10 can be used to implement any of the network elements shown in FIG. 1 as necessary in order to implement any of the functionalities of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of a session controller, system 10 may be a server that in general has no need for a display 24 or one or more other components shown in FIG. 2.

System 10 includes a bus 12 or other communications mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium. System 10 further includes a communications device 20, such as a network interface card, to provide access to a network. Therefore, a user may interface with system 10 directly, or remotely through a network, or any other method.

Computer-readable media may be any available media that can be accessed by processor 22 and includes both volatile and nonvolatile media, removable and non-removable media, and communications media. Communications media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a session controller module 16 for providing relaying, and all other functionality disclosed herein. Accordingly, system 10 may be a specialized computer system that executes session controller module 16 for providing relaying, and all other functionality disclosed herein. Alternatively or additionally, system 10 can be part of a larger system, such as added functionality to the "Oracle Communications WebRTC Session Controller" from Oracle Corp. Therefore, system 20 can include one or more additional functional modules 18 to include the additional functionality. A database 17 is coupled to bus 12 to provide centralized storage for session controller module 16 and additional functional modules 18.

Figure 6:
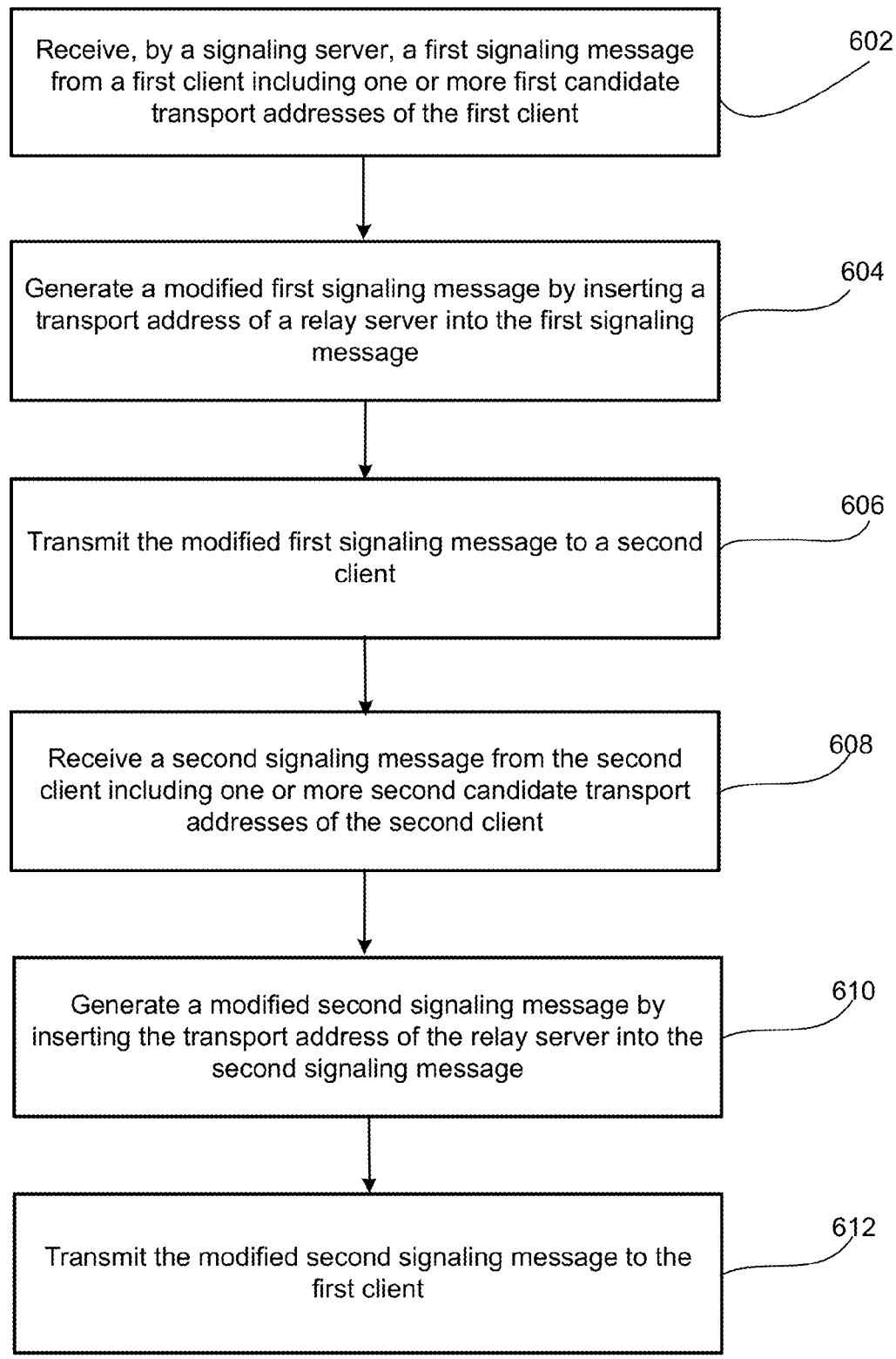
FIG. 6 is a flow diagram of the operation of the session controller module of FIG. 2 when relaying media traffic in accordance with embodiments of the present invention.

In one embodiment, session controller modules 16 and/or additional functional modules 18 may include a receiving module that receives, by a signaling server, a first signaling message from a first client including one or more first candidate transport addresses of the first client; a generating module that generates a modified first signaling message by inserting a transport address of a relay server into the first signaling message; a transmitting module that transmits the modified first signaling message to a second client; the receiving module further receiving a second signaling message from the second client including one or more second candidate transport addresses of the second client; the generating module further generating a modified second signaling message by inserting the transport address of the relay server into the second signaling message; and the transmitting module further transmitting the modified second signaling message to the first client, as will be described herein with reference to FIG. 6.

Referring again to FIG. 1, with known systems, first WebRTC application 104 and second WebRTC application 105 may need to establish a peer to peer ("P2P") communication according to real-time protocols (e.g., for voice, video, data, etc.). In one embodiment, first WebRTC application 104 and second WebRTC application 105 may use a two-phase exchange of signaling messages to establish multimedia sessions. For example, in one embodiment, first WebRTC application 104 and second WebRTC application 105 may use Session Description Protocol ("SDP") offer/answer messages to establish multimedia sessions. SDP is a format for describing streaming media initialization parameters. However, in alternative embodiments, a signaling protocol different than SDP may be used to establish multimedia sessions.

In some systems, one or both of first WebRTC application 104 and second WebRTC application 105 may be located behind a NAT server, i.e., their traffic may traverse a respective one of a first NAT server 112 and a second NAT server 113. NAT provides a mechanism for modifying network address information in Internet Protocol ("IP") datagram packet headers while they are in transit across a traffic routing device, so that one IP address space can be remapped into another. As such, NATs can "hide" private networks behind public IP addresses referred to as server-reflexive addresses, so that connections can be initiated from the private network to the Internet, but not the other way around. NAT works by associating a public address and port with a private destination address and port.

If one or both of first WebRTC application 104 and second WebRTC application 105 are located behind a NAT server, it may not be possible to establish a direct P2P connection since protocols that use a two-phase message exchange (e.g., "offer/answer") are difficult to operate through NATs. More specifically, since the purpose of these protocols is to establish a flow of media packets, they tend to carry IP addresses and ports of media sources and sinks within their messages, which is problematic through NATs. These protocols also seek to create a media flow directly between participants so that there is no application layer intermediary between them. This is done to reduce media latency, decrease packet loss, and reduce the operational costs of deploying an application. However, this direct connection is also difficult to accomplish through NATs.

One known solution for performing RTC between two WebRTC-based clients that are located behind NATs is to provide a relay server to relay traffic between the clients. This relay server needs to have an IP address that is reachable by both WebRTC-based clients. An example of such a relay server is a Traversal Using Relays around NAT ("TURN") server, as described in IETF standard, Request for Comments ("RFC") 5766. TURN is a protocol that allows a host to control the operation of a relay and to exchange packets with its peers using the relay. TURN is an extension to Session Traversal Utilities for NAT ("STUN") protocol, as described in IETF standard, RFC 5389. STUN is a protocol used by other protocols for NAT traversal. It can be used by an endpoint to discover the IP address and port allocated to it by a NAT. Such allocated IP address and port is referred to as a "server reflexive" address. STUN can also be used to check connectivity between two endpoints, and as a keep-alive protocol to maintain NAT bindings.

Figure 3:
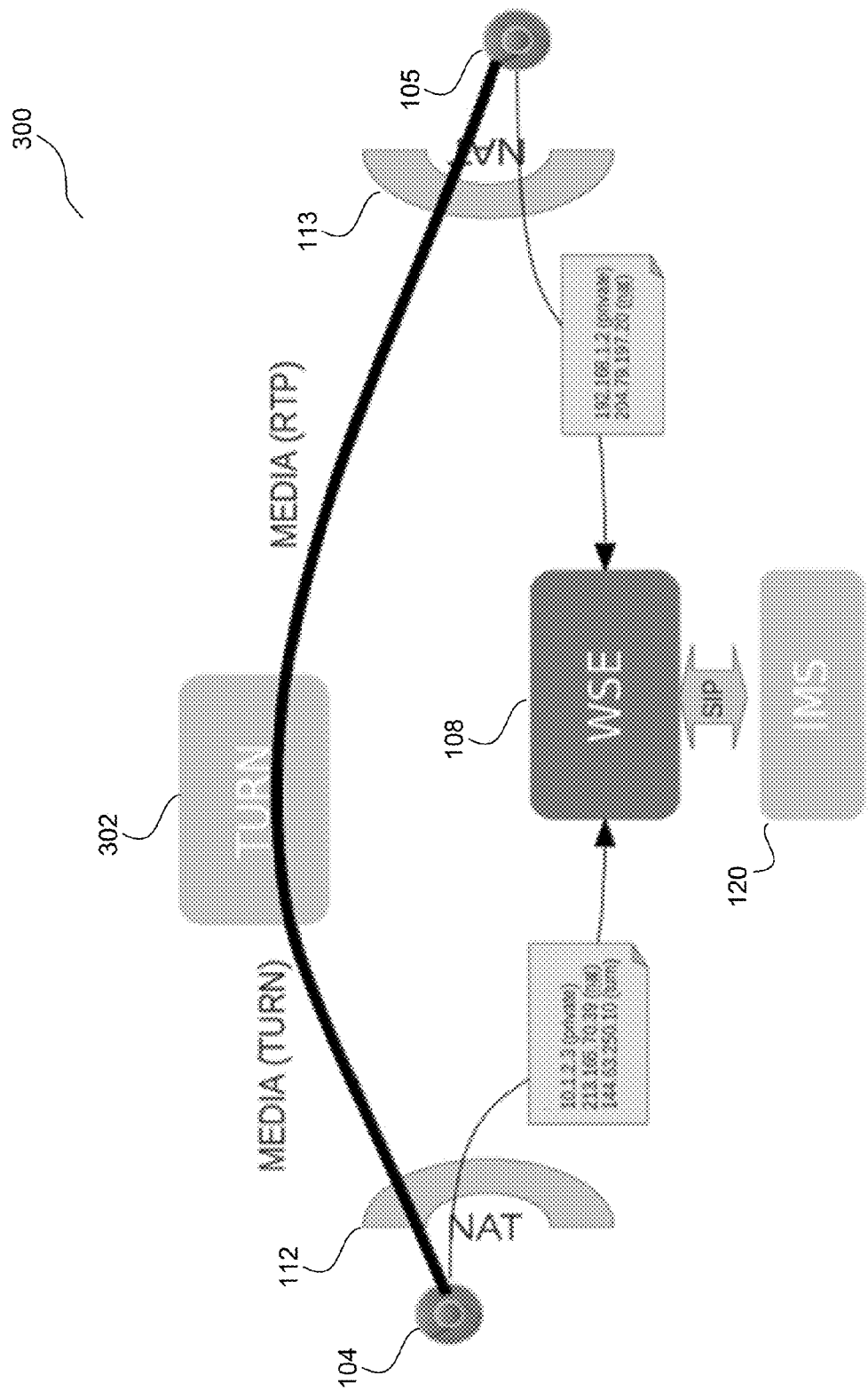
FIG. 3 is a block diagram of a prior art system for relaying media traffic.

FIG. 3 is a prior art system 300 for relaying media traffic between two WebRTC-based clients that are behind NATs. System 300 includes network elements such as first WebRTC application 104 behind first NAT server 112, second WebRTC application 105 behind second NAT server 113, and signaling engine 108 (also referred to as WSC signaling engine ("WSE")) that connects first WebRTC application 104 and second WebRTC application 105 to SIP network 120 (which may be, for example, an IMS network), as described herein with reference to FIG. 1.

System 300 further includes a TURN server 302 that is used to relay media traffic between first WebRTC application 104 and second WebRTC application 105. In this example, first WebRTC application 104 explicitly allocates resources on TURN server 302 to relay traffic, requiring a separate authentication to be performed with TURN server 302. The address of TURN server 302 is then included in a signaling message (e.g., an offer SDP) from first WebRTC application 104 to signaling engine 108. Signaling engine 108 then transparently forwards the signaling message to second WebRTC application 105. Thereafter, based on an Interactive Connectivity Establishment ("ICE") negotiation between first WebRTC application 104 and second WebRTC application 105 (without signaling engine 108 being involved), TURN server 302 may be selected for media communication. ICE is a protocol for NAT traversal for UDP-based multimedia sessions established with a two-phase exchange of signaling messages (e.g., the "offer/answer" model), as described in IETF standard, RFC 5245. It makes use of STUN and its extension TURN. ICE can be used by any protocol utilizing a two-phase message exchange, such as the offer/answer model in SIP.

In a typical ICE deployment, two endpoints (also called agents) use a signaling protocol (e.g., SIP) to perform a two-phase exchange of signaling messages (e.g., an offer/answer exchange of SDP messages) to set up a media session. At the beginning of the ICE process, the agents do not know their own topologies. In particular, they may or may not be behind a NAT (or multiple tiers of NATs). ICE allows the agents to discover enough information about their topologies to potentially find one or more paths by which they can communicate. Each agent may have a variety of candidate "transport addresses" it could use to communicate with the other agent. A transport address is a combination of IP address and port for a particular transport protocol, e.g., UDP.

The candidate transport addresses may include a transport address on a directly attached network interface, a translated transport address on the public side of a NAT (i.e., a "server reflexive" address), and/or a transport address allocated at a TURN server (i.e., a "relayed address"). Potentially, any candidate transport address of one endpoint can be used to communicate with any candidate transport address of the other endpoint. However, many combinations will not work. For instance, if both endpoints are behind NATs, their directly attached interface addresses are unlikely to be able to communicate directly. The purpose of ICE is to discover which pairs of transport addresses will work by trying different possible pairs in a certain order until it finds one or more pairs of transport addresses that work.

One disadvantage with this known approach is that to use a TURN server a client needs a lot of extra logic. The client also needs to be configured properly. For example, the client needs to know the host (i.e., the IP address and port) of the relay server, and needs to be provisioned at the relay server (i.e., have an account with a user name and password). Additionally, a TURN server tunnels Real-time Transport Protocol ("RTP") streams in a separate protocol, hence there is data overhead due to data that is sent over the network connection. RTP is a protocol that defines a standardized packet format for delivering audio and video over IP networks.

Further, since the client must first allocate a TURN resource before it can initiate a session, there is relay overhead due to session setup to allocate resources on the relay server. These features of TURN lead to extra complexity and potential security risks. Moreover, the TURN relay implements a very generic data relay function, and hence may potentially be abused to relay data types different than those originally intended.

Additionally, TURN assumes an offer-answer state machine and an underlying SDP, but SDP is particularly criticized for not being web-friendly and is becoming increasingly difficult for web developers to adapt to and use.

In contrast to the known solutions, one embodiment of the present invention provides a WSE relay solution based on signaling modification (e.g., SDP modification or modification in an alternative signaling protocol), such that the browser applications no longer need a TURN server for relaying media traffic. Referring again to FIG. 1, in one embodiment, signaling engine 108 is configured to communicate with a first JavaScript ("JS") software development kit ("SDK") 107 within first WebRTC application 104 and a second JS SDK 109 within second WebRTC application 105 to control the relaying of media streams between first WebRTC application 104 and second WebRTC application 105.

In some embodiments, first WebRTC application 104 and second WebRTC application 105 may still use a STUN server to discover server reflexive addresses so they can find better ICE candidates. In one embodiment, neither one of first JS SDK 107 and second JS SDK 109 inserts a relay candidate in signaling messages, but signaling engine 108 inserts itself as a relay candidate (e.g., inserts a relay candidate transport address 110 of itself) in signaling messages of both first WebRTC application 104 and second WebRTC application 105 (e.g., in offer/answer SDPs). Accordingly, if the other candidates fail during ICE negotiation, first JS SDK 107 and second JS SDK 109 may decide to use signaling engine 108 for relaying media. In one embodiment, signaling engine 108 may include a number of computer nodes which provide media relay functionality and also functionality for controlling the signaling servers. These functionalities are logical entities that may be implemented via independent processes or nodes according to specific customer deployment requirements.

Figure 4:
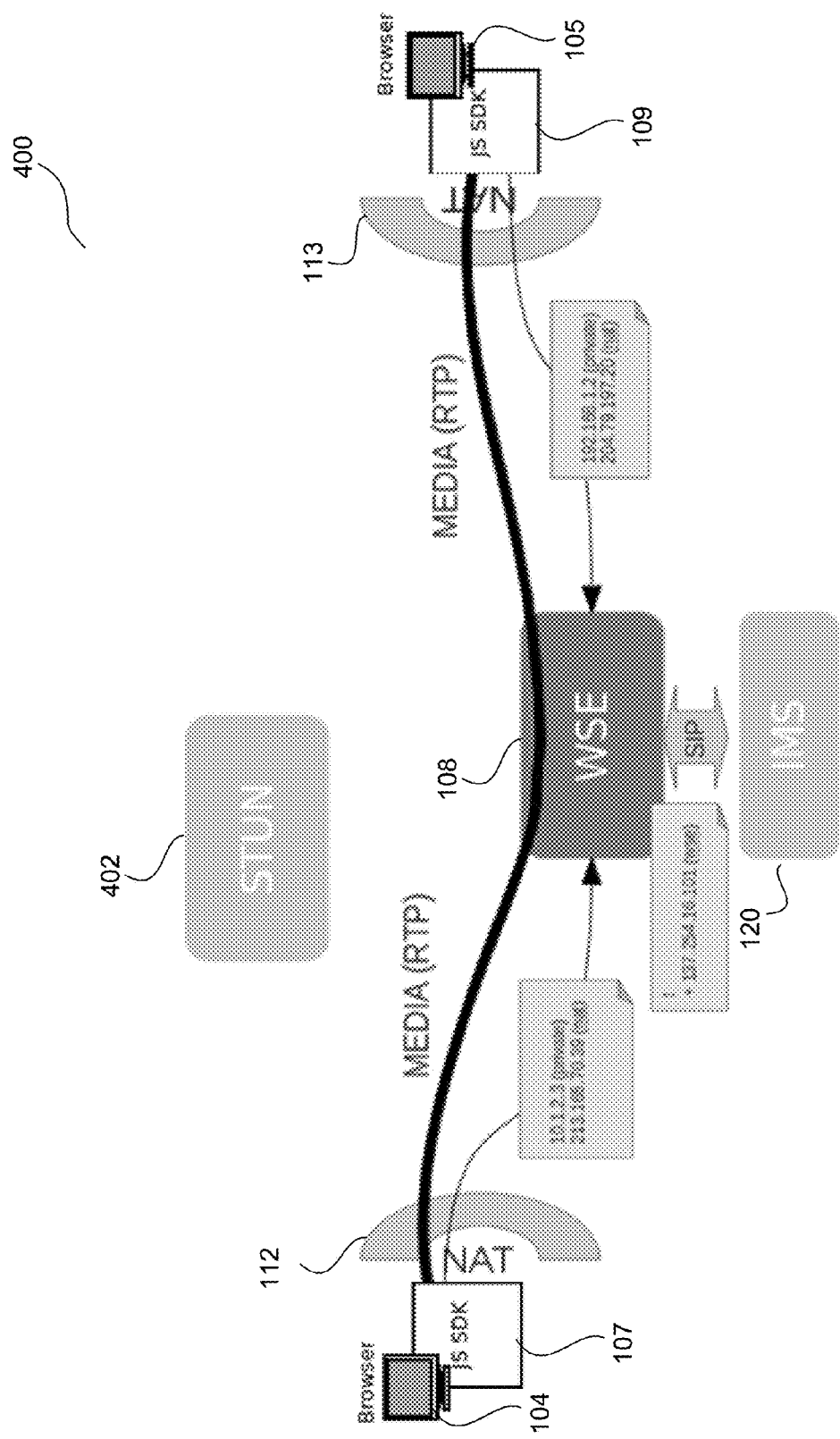
FIG. 4 is a block diagram of an example system for relaying media traffic in accordance with embodiments of the present invention.

FIG. 4 is an example system 400 for relaying media traffic between two WebRTC-based clients that are behind NATs, in accordance with some present embodiments. System 400 includes network elements such as first WebRTC application 104 behind first NAT server 112, second WebRTC application 105 behind second NAT server 113, first JS SDK 107, second JS SDK 109, and signaling engine 108 (also referred to as WSE) that connects first WebRTC application 104 and second WebRTC application 105 to SIP network 120 (which may be, for example, an IMS network), as described herein with reference to FIG. 1. System 400 further includes a STUN server 402 that is used by first WebRTC application 104 and second WebRTC application 105 to discover server reflexive addresses so they can find better ICE candidates. In one embodiment, the signaling messages of first WebRTC application 104 and second WebRTC application 105 may be offer/answer SDP messages. However, in other alternative embodiments, other signaling protocols may be used to exchange signaling messages.

In system 400, first JS SDK 107, second JS SDK 109, and signaling engine 108 first negotiate the form of data that carries the IP, port, and protocol candidates for media communications. For example, the protocol candidates may be JSON, Extensible Markup Language ("XML"), SDP, a simple property list, etc. Upon finishing this negotiation, each side knows where and how (e.g., in what format) in a message the candidates appear.

Thereafter, first JS SDK 107 uses first WebRTC application 104 to perform a candidate search on the local environment and prepares a candidate list. The candidate list may be augmented by special logic (e.g., location information about first UE 102).

Then, the candidate list is sent to signaling engine 108 which, in turn, adds one or more additional candidates based on the information first JS SDK 107 has inserted in the signaling message. For example, signaling engine 108 may use the location information of first UE 102 to choose the IP address of a media engine as an additional candidate. Signaling engine 108 sends the modified list to second JS SDK 109, which, in turn, similarly prepares a corresponding candidate list and sends it back to signaling engine 108. Signaling engine 108 similarly augments this candidate list and forwards it to first JS SDK 107. At this time, first JS SDK 107 and second JS SDK 109 have a candidate list of the other party, and can thus use the best possible route for media traffic between first UE 102 and second UE 103. In some alternative embodiments, first UE 102 or second UE 103 may correspond to a user agent connected to IMS network 102 instead of a browser application.

In one embodiment, for example, first WebRTC application 104 sends a first signaling message to signaling engine 108 including a private transport address and a server reflexive address that are available to first WebRTC application 104. Signaling engine 108 receives the first signaling message, inserts its own transport address as a candidate in the first signaling message, and forwards the modified first signaling message to second WebRTC application 105. Upon receiving the modified first signaling message, second WebRTC application 105 sends a second signaling message back to signaling engine 108 including a private transport address and a server reflexive transport address that are available to second WebRTC application 105. Signaling engine 108 receives the second signaling message, inserts its own transport address as a candidate in the second signaling message, and forwards the modified second signaling message to first WebRTC application 104. Thereafter, ICE can be used by first WebRTC application 104 and second WebRTC application 105 to determine the best candidate, and signaling engine 108 may be selected for media communication according to RTP.

Figure 5:
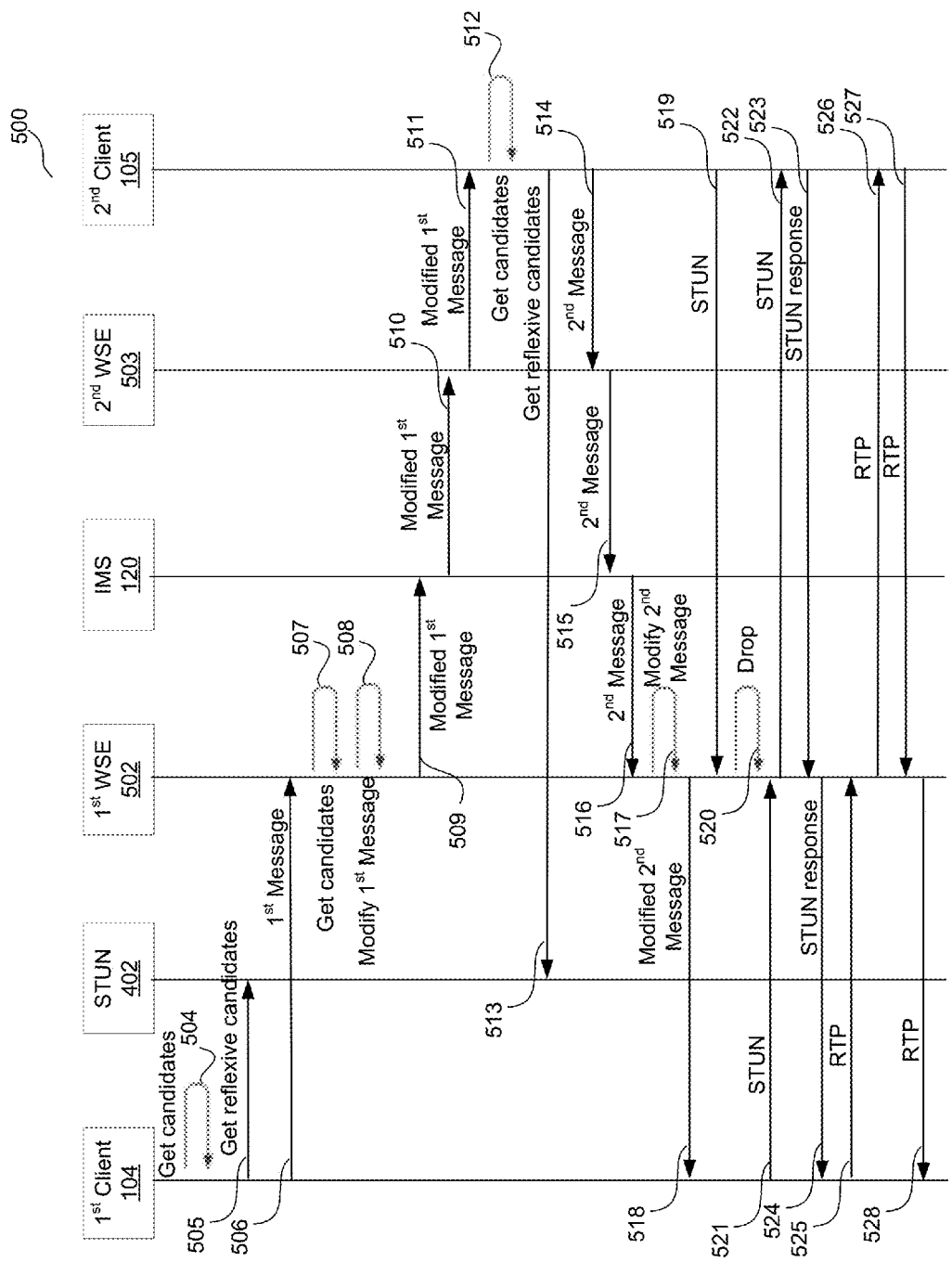
FIG. 5 is an example message sequence diagram for relaying media traffic in accordance with embodiments of the present invention.

FIG. 5 is an example message sequence flow 500 for a signaling engine relay in one embodiment. In one embodiment, the exchanged signaling messages may be SDP messages. However, the present embodiments are applicable to other systems using messaging protocols different than SDP.

Sequence flow 500 includes network elements such as first WebRTC application 104 (denoted as "1$^{st}$ client") and second WebRTC application 105 (denoted as "2$^{nd}$ client") as described herein with reference to FIG. 1. However, unlike system 100 of FIG. 1 in which the same signaling engine 108 was implemented to connect first WebRTC application 104 and second WebRTC application 105 to SIP network 120 (which may be, for example, an IMS network), in FIG. 5, separate signaling engines are used for each application. Specifically, a first WSE 502 is used to connect first WebRTC application 104 to SIP network 120, and a second WSE 503 is used to connect second WebRTC application 105 to SIP network 120. FIG. 5 further includes STUN server 402 that is used by first WebRTC application 104 and second WebRTC application 105 to discover reflexive addresses so they can find better ICE candidates, as described herein with reference to FIG. 4.

At 504, first client 104 gets its corresponding host candidates (i.e., the transport addresses that are directly available to first client 104, e.g., "h1").

At 505, first client 104 reaches STUN server 402 to get its candidate reflexive addresses (e.g., "r1"). In this example, STUN server 402 does not provide any TURN relay candidate transport addresses to first client 104, and these candidates include only local candidates of first client 104.

At 506, first client 104 creates and sends a first signaling message (e.g., an SDP offer) to first WSE 502 (e.g., a "start" message with "SDP1" including "h1" and "r1"). The first signaling message includes all candidate transport addresses available to first client 104.

At 507, first WSE 502 allocates an available IP address and port (e.g., "w1") on a relay server it controls.

At 508, first WSE 502 inserts this IP address and port into the first signaling message of first client 104. In one embodiment, first WSE 502 inserts this IP address and port as the lowest priority candidate.

At 509, first WSE 502 sends the modified first signaling message (e.g., an "INVITE" message with "SDP1" now including "h1," "r1," and "w1") to IMS network 120.

At 510, IMS network 120 forwards this message (e.g., the "INVITE" message with "SDP1" including "h1," "r1," and "w1") to second WSE 503.

At 511, second WSE 503 sends the modified first signaling message to second client 105 (e.g., a "start" message with "SDP1" including "h1," "r1," and "w1"). In one embodiment, since the modified first signaling message already includes a relay candidate inserted by first WSE 502, second client WSE 503 does not add any relay candidates in the modified first signaling message. In alternative or additional embodiments, however, second WSE 503 may insert a relay candidate that it controls into the modified first signaling message. For example, second WSE 503 may allocate an available IP address and port on a relay server it controls, and then insert this IP address and port into the modified first signaling message of first client 104. In one embodiment, second WSE 503 inserts this IP address and port as the lowest priority candidate.

At 512, second client 105 gets its corresponding host candidates (i.e., the transport addresses that are directly available to second client 105, e.g., "h2").

At 513, second client 105 reaches STUN server 402 to get its candidate reflexive addresses (e.g., "r2").

At 514, second client 105 creates and sends a second signaling message to second WSE 503 (e.g., a "start" message with "SDP2" including "h2" and "r2"). The second signaling message includes all candidate transport addresses available to second client 105. In one embodiment, these candidates include only local candidates of second client 105.

At 515, if second WSE 503 had not previously included a relay candidate in the first signaling message, it sends a message back to IMS network 120 with the second signaling message (e.g., a "200" message with "SDP2" including "h2" and "r2"). However, in alternative embodiments, if second WSE 503 had included a relay candidate in the first signaling message, it adds the same relay candidate in the second signaling message and then sends it back to IMS network 120.

At 516, IMS network 120 forwards the second signaling message (e.g., the "200" message with "SDP2" including "h2" and "r2") to first WSE 502.

At 517, since first WSE 502 had previously included a relay candidate (i.e., the available IP address and port on the relay server it controls, e.g., "w1") in the first signaling message, it again inserts the same into the second signaling message of second client 105. In one embodiment, first WSE 502 inserts this relay candidate as the lowest priority candidate.

At 518, first WSE 502 sends a message to first client 104 with the modified second signaling message (e.g., a "start" message with "SDP2" now including "h2," "r2," and "w1").

Upon receiving the modified second signaling message, first client 104 and second client 105 start ICE negotiation by sending STUN messages to the candidates (e.g., "h1," "r1," "h2," "r2," and "w1"). If first client 104 and second client 105 succeed in creating a direct connection using their local candidates (e.g., "h1," "r1," "h2," and "r2"), then no relay is needed. If no local candidate can get STUN messages from both first client 104 and second client 105, first client 104 and second client 105 try the relay candidate (e.g., "w1"), as described in one example embodiment as follows.

At 519, second client 105 sends a STUN message to first WSE 502.

At 520, first WSE 502 drops the STUN message from second client 105. A STUN message may be dropped so that both sides send their initial requests before being connected. Accordingly, before 521, both sides have sent their initial requests to first WSE 502.

At 521, first client 104 sends a STUN message to first WSE 502.

At 522, first WSE 502 forwards the STUN message to second client 105.

At 523, second client 105 sends a STUN response message back to first WSE 502.

At 524, first WSE 502 forwards the STUN response message to first client 104. At this time, WSE 502 is selected for relaying media traffic between first client 104 and second client 105 and communication of media can start.

For example, at 525, first client 104 sends an RTP packet to first WSE 502.

At 526, first WSE 502 forwards the RTP packet of first client 104 to second client 105.

At 527, second client 105 sends another RTP packet to first WSE 502.

At 528, first WSE 502 forwards this RTP packet of second client 105 to first client 104. In one embodiment, the relay server controlled by WSE 502 is configured to transparently relay RTP packets between the two endpoints without the need to decode or encode data except for a few initial ICE messages to verify the identity of the source.

In these embodiments, as compared to TURN, a client does not need to know the host (i.e., the IP address and port) of the TURN server, the client does not need to be provisioned at the TURN server (i.e., have an account with user name and password), there is no overhead of data that is sent over the wire (compared to TURN that tunnels RTP streams in a separate protocol), and there is no relay overhead for session setup to allocate resources on the relay server (compared to TURN where the client must first allocate a TURN resource before it can initiate the session).

Additionally, in some embodiments, first JS SDK 107 and/or second JS SDK 109 may provide corresponding client information and negotiate with signaling engine 108 to choose a relay server for relaying media traffic. For example, if both clients involved in an RTC are located in Australia, then selecting a computer in Sidney for relaying traffic is preferable over selecting a computer in Los Angeles. Similarly, first JS SDK 107 and/or second JS SDK 109 may inform WSC 106 about the media type to be relayed (e.g., that the media type is a 4k video) so that WSC 106 chooses a relay server that can handle a corresponding bandwidth. Similarly, in one embodiment, first JS SDK 107 and/or second JS SDK 109 may inform WSC 106 about the duration of the RTC (e.g., that a video will be very long, such as a live telecast) so that a dedicated relay node may be assigned for relaying media traffic.

Further, in these embodiments, a relay is allocated automatically by the signaling server and this is transparent to the clients, thus simplifying the client logic and resulting in faster session setup. Further, the allocated relay is tightly coupled with the signaling session which allows first WSE 502 to control how the relay can be used. For example, it can tear down the relay as soon as the signaling session closes, thus prohibiting possible abuse of this relay outside of a signaling session. Additionally, a client does not need to implement the TURN protocol since the relay transparently relays the RTP stream unmodified, which makes the client simpler and also makes the communication more efficient since there is no protocol tunneling needed.

Even further, there is no need for an additional authentication step toward the relay server since this server is controlled by first WSE 502 that has already authenticated first client 104. Moreover, embodiments allow first WSE 502 to make intelligent decisions about the relay to be used, since the type of media to relay and the two clients are known before the relay needs to be allocated. This allows for better control of quality of service ("QoS") and resource restrictions. Additionally, this type of relay can multiplex multiple client streams using a same port to save resources, while a TURN server must use a unique port for each client. Accordingly, embodiments can scale better on a single server.

FIG. 6 is a flow diagram of the operation of WSC 106 of FIG. 1 and/or session controller module 16 of FIG. 2 when providing a media relay in accordance with embodiments of the present invention. In one embodiment, the functionality of the flow diagram of FIG. 6 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 602, signaling engine 108 of WSC 106 receives a first signaling message from first WebRTC application 104 (i.e., a first client) including one or more first candidate transport addresses of first WebRTC application 104. In some embodiments, the first signaling message includes only local candidates of first WebRTC application 104. In one embodiment, before receiving the first signaling message, first JS SDK 107 of first WebRTC application 104 negotiates with signaling engine 108 for determining a format for the first signaling message and for including the one or more first candidate transport addresses in the first signaling message. In one embodiment, first JS SDK 107 further negotiates with signaling engine 108 for selecting the relay server based on characteristics of at least one of first WebRTC application 104, second WebRTC application 105, or the RTC. Such characteristics may include, for example, the location of the respective clients running WebRTC application 104 and second WebRTC application 105, or the type, duration, and/or bandwidth of the RTC.

At 604, signaling engine 108 generates a modified first signaling message by inserting a transport address of a relay server it controls into the first signaling message. In order to do so, upon receiving the first signaling message, signaling server 108 allocates an available IP address and port on the relay server. The transport address of the relay server then includes this available IP address and port. In some embodiments, signaling server inserts this transport address as a lowest priority candidate into the first signaling message.

At 606, signaling engine 108 transmits the modified first signaling message to second WebRTC application 105 (i.e., a second client).

At 608, signaling engine 108 receives a second signaling message from second WebRTC application 105 including one or more second candidate transport addresses of second WebRTC application 105. In some embodiments, the second signaling message includes only local candidates of second WebRTC application 105.

At 610, signaling engine 108 generates a modified second signaling message by inserting the transport address of the same relay server it controls into the second signaling message. In some embodiments, signaling server 108 inserts the transport address of the relay as a lowest priority candidate into the second signaling message.

At 612, signaling engine 108 transmits the modified second signaling message to first WebRTC application 104. At this time, first WebRTC application 104 and second WebRTC application 105 start ICE negotiation using the first candidate transport addresses, the second candidate transport addresses, and the transport address of the relay server. If first WebRTC application 104 and second WebRTC application 105 cannot create a direct connection using their local candidates, the relay server is used to communicate RTP streams between first WebRTC application 104 and second WebRTC application 105.

As disclosed, embodiments provide transparent relaying of media traffic for RTC of WebRTC-based clients that cannot directly communicate due to NAT. In one embodiment, without the endpoints being aware, a signaling server transparently inserts itself as a relay candidate in the signaling messages between the clients. In one embodiment, if the clients do not find a better candidate for establishing a direct connection, they use the signaling server to relay media traffic. Accordingly, there is no need for a separate relay server such as TURN, thus the complexities and overheads of using a TURN server are avoided.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by a processor, cause the processor to provide a media relay for real-time communications (RTC), the providing comprising:
   receiving, by a signaling server, a first signaling message from a first client including one or more first candidate transport addresses of the first client;
   generating a modified first signaling message by inserting a transport address of a relay server into the first signaling message;
   transmitting the modified first signaling message to a second client;
   receiving a second signaling message from the second client including one or more second candidate transport addresses of the second client;
   generating a modified second signaling message by inserting the transport address of the relay server into the second signaling message; and
   transmitting the modified second signaling message to the first client,
   wherein the signaling server selects the relay server based on characteristics of at least one of the first client, the second client, or the RTC and in response to interactions with a JavaScript (JS) software development kit (SDK) at the first client.

2. The non-transitory computer-readable medium of claim 1,
   wherein, before the receiving of the first signaling message, the JS SDK at the first client negotiates with the signaling server for determining a format for the first signaling message and for including the one or more first candidate transport addresses in the first signaling message.

3. The non-transitory computer-readable medium of claim 1,
   wherein the first client and the second client start Interactive Connectivity Establishment (ICE) negotiation using the one or more first candidate transport addresses, the one or more second candidate transport addresses, and the transport address of the relay server.

4. The non-transitory computer-readable medium of claim 1,
   wherein, upon receiving the first signaling message, the signaling server allocates an available internet protocol (IP) address and port on the relay server;
   wherein the transport address of the relay server comprises the available IP address and port.

5. The non-transitory computer-readable medium of claim 1,
   wherein the signaling server inserts the transport address of the relay server as a lowest priority candidate into the first signaling message and the second signaling message.

6. The non-transitory computer-readable medium of claim 1,
   wherein the first signaling message includes only local candidates of the first client;
   wherein the second signaling message includes only local candidates of the second client.

7. The non-transitory computer-readable medium of claim 1,
   wherein, when the first client and the second client cannot create a direct connection using respective local candidates, the relay server is used to communicate real time transport protocol (RTP) streams between the first client and the second client.

8. A method of providing a media relay for real-time communications (RTC), comprising:
- receiving, by a signaling server, a first signaling message from a first client including one or more first candidate transport addresses of the first client;
- generating a modified first signaling message by inserting a transport address of a relay server into the first signaling message;
- transmitting the modified first signaling message to a second client;
- receiving a second signaling message from the second client including one or more second candidate transport addresses of the second client;
- generating a modified second signaling message by inserting the transport address of the relay server into the second signaling message; and
- transmitting the modified second signaling message to the first client,
- wherein the signaling server selects the relay server based on characteristics of at least one of the first client, the second client, or the RTC and in response to interactions with a JavaScript (JS) software development kit (SDK) at the first client.

9. The method of claim 8,
- wherein, before the receiving of the first signaling message, the JS SDK at the first client negotiates with the signaling server for determining a format for the first signaling message and for including the one or more first candidate transport addresses in the first signaling message.

10. The method of claim 8,
- wherein the first client and the second client start Interactive Connectivity Establishment (ICE) negotiation using the one or more first candidate transport addresses, the one or more second candidate transport addresses, and the transport address of the relay server.

11. The method of claim 8,
- wherein, upon receiving the first signaling message, the signaling server allocates an available internet protocol (IP) address and port on the relay server;
- wherein the transport address of the relay server comprises the available IP address and port.

12. The method of claim 8,
- wherein the signaling server inserts the transport address of the relay server as a lowest priority candidate into the first signaling message and the second signaling message.

13. The method of claim 8,
- wherein the first signaling message includes only local candidates of the first client;
- wherein the second signaling message includes only local candidates of the second client.

14. The method of claim 8,
- wherein, when the first client and the second client cannot create a direct connection using respective local candidates, the relay server is used to communicate real time transport protocol (RTP) streams between the first client and the second client.

15. A system that provides a media relay for real-time communications (RTC), comprising:
- a processor; and
- a memory storing one or more programs for execution by the processor, the one or more programs including instructions for:
- receiving, by a signaling server, a first signaling message from a first client including one or more first candidate transport addresses of the first client;
- generating a modified first signaling message by inserting a transport address of a relay server into the first signaling message;
- transmitting the modified first signaling message to a second client;
- receiving a second signaling message from the second client including one or more second candidate transport addresses of the second client;
- generating a modified second signaling message by inserting the transport address of the relay server into the second signaling message; and
- transmitting the modified second signaling message to the first client,
- wherein the signaling server selects the relay server based on characteristics of at least one of the first client, the second client, or the RTC and in response to interactions with a JavaScript (JS) software development kit (SDK) at the first client.

16. The system of claim 15,
- wherein, before the receiving of the first signaling message, the JS SDK at the first client negotiates with the signaling server for determining a format for the first signaling message and for including the one or more first candidate transport addresses in the first signaling message.

17. The system of claim 15,
- wherein the first client and the second client start Interactive Connectivity Establishment (ICE) negotiation using the one or more first candidate transport addresses, the one or more second candidate transport addresses, and the transport address of the relay server.

18. The system of claim 15,
- wherein, upon receiving the first signaling message, the signaling server allocates an available internet protocol (IP) address and port on the relay server;
- wherein the transport address of the relay server comprises the available IP address and port.

19. The system of claim 15,
- wherein the signaling server inserts the transport address of the relay server as a lowest priority candidate into the first signaling message and the second signaling message.

20. The system of claim 15,
- wherein the first signaling message includes only local candidates of the first client;
- wherein the second signaling message includes only local candidates of the second client.

* * * * *